(12) United States Patent
Lee et al.

(10) Patent No.: US 10,103,987 B2
(45) Date of Patent: Oct. 16, 2018

(54) PACKET OUTPUT CONTROLLING METHOD AND NETWORK DEVICE USING SAME

(71) Applicant: KT Corporation, Seongnam-si, Gyeonggi-do (KR)

(72) Inventors: Se Hui Lee, Daejeon (KR); Jeong Wook Lee, Daejeon (KR); Tae Jin Ahn, Daejeon (KR); Kyung Ah Han, Daejeon (KR)

(73) Assignee: KT Corporation, Seongnam-si (KR)

( * ) Notice: Subject to any disclaimer, the term of this patent is extended or adjusted under 35 U.S.C. 154(b) by 149 days.

(21) Appl. No.: 14/914,696

(22) PCT Filed: Aug. 28, 2014

(86) PCT No.: PCT/KR2014/008030
§ 371 (c)(1),
(2) Date: Feb. 26, 2016

(87) PCT Pub. No.: WO2015/030503
PCT Pub. Date: Mar. 5, 2015

(65) Prior Publication Data
US 2016/0212047 A1    Jul. 21, 2016

(30) Foreign Application Priority Data

Aug. 29, 2013  (KR) .................. 10-2013-0103468
Dec. 24, 2013  (KR) .................. 10-2013-0162390

(51) Int. Cl.
*H04L 12/741* (2013.01)
*H04L 12/935* (2013.01)
(Continued)

(52) U.S. Cl.
CPC ............ *H04L 45/745* (2013.01); *H04L 45/38* (2013.01); *H04L 45/64* (2013.01); *H04L 49/3063* (2013.01); *H04L 49/354* (2013.01)

(58) Field of Classification Search
CPC ....... H04L 45/745; H04L 49/354; H04L 45/64; H04L 49/3063; H04L 45/38
See application file for complete search history.

(56) References Cited

U.S. PATENT DOCUMENTS 7,251,245 B2    7/2007  Oman
7,340,535 B1*   3/2008  Alam .................... H04L 45/00
                                                           370/392
(Continued)

FOREIGN PATENT DOCUMENTS

KR  10-2005-0063799 A  6/2005
KR  10-2006-0090497 A  8/2006

OTHER PUBLICATIONS

International Search Report of PCT/KR2014/008030 dated Dec. 30, 2014.

*Primary Examiner* — Jay P Patel
(74) *Attorney, Agent, or Firm* — Sughrue Mion, PLLC

(57) ABSTRACT

Disclosed are a packet output controlling method and a network device using the same. A packet output controlling method according to the present invention, as a method for processing flow in a plurality (N, where N is a natural number of 2 or greater) of flow tables connected by a pipeline, may comprise the steps of: passing a packet input into a flow from a first table to an N–1st table from among a plurality of tables; processing an output-dedicated Nth table (egress table) guided by the N–1st table with respect to the packet after the packet passes the N–1st table; and outputting the packet after processing the Nth table. Accordingly, the flexible control of a final output is made possible through various operations using output port information.

10 Claims, 9 Drawing Sheets

(51) Int. Cl.
  *H04L 12/721* (2013.01)
  *H04L 12/715* (2013.01)
  *H04L 12/931* (2013.01)

(56) References Cited

U.S. PATENT DOCUMENTS

| | | | |
|---|---|---|---|
| 8,885,634 B2 * | 11/2014 | Ghodrat | H04L 12/4641 370/230.1 |
| 9,143,437 B1 * | 9/2015 | Grosser | H04L 45/16 |
| 2003/0086422 A1 * | 5/2003 | Klinker | H04L 29/06 370/389 |
| 2003/0223361 A1 * | 12/2003 | Hussain | H04L 43/026 370/230 |
| 2005/0047411 A1 * | 3/2005 | Kadambi | H04L 12/46 370/389 |
| 2006/0050690 A1 | 3/2006 | Epps et al. | |
| 2006/0176893 A1 * | 8/2006 | Ku | H04L 49/3027 370/412 |
| 2013/0064246 A1 * | 3/2013 | Dharmapurikar | H04L 49/351 370/392 |
| 2013/0163427 A1 * | 6/2013 | Beliveau | H04L 67/327 370/235 |
| 2014/0010096 A1 * | 1/2014 | Kamble | H04L 49/354 370/252 |
| 2014/0334489 A1 * | 11/2014 | Bosshart | H04L 47/56 370/392 |
| 2015/0047010 A1 * | 2/2015 | Kizu | H04L 67/322 726/11 |
| 2016/0014018 A1 * | 1/2016 | Grosser | H04L 45/16 370/390 |

* cited by examiner

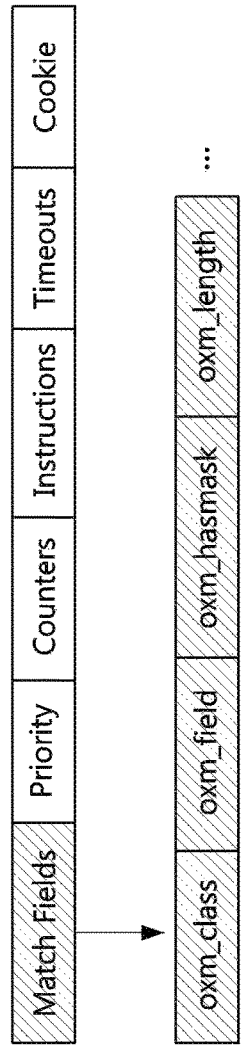

| | FIELD NAME | SIZE (BITS) | USE | REMARKS |
|---|---|---|---|---|
| TYPE | OXM_CLASS | 16 | CLASS DISCRIMINATION | OPERATIONS SUCH AS SIZE COMPARISON ARE DISCRIMINATED FROM 'MATCHING CLASS' |
| | OXM_FIELDS | 7 | MATCH FIELD | |
| | OXM_HASMASK | 1 | WHETHER A BIT-MASKING IS APPLIED TO A VALUE | |
| LENGTH | OXM_LENGTH | 8 | LENGTH OF 'VALUE' FIELD | |
| VALUE | OXM_OPERATOR | 8 | OPERATOR ('<','<=','=','>','>=' …) | 0 FOR OPERATIONS SUCH AS SIZE COMPARISON |
| | OXM_VALUE | VARIABLE | VALUE DATA | |

FIG. 10

| oxm_class | oxm_fields | oxm_hasmask | oxm_length | oxm_value | oxm_mask |
|---|---|---|---|---|---|
| matching class | DST_IP | 1 | 4 | 10.1.1.1 | 255.255.255.0 |

FIG. 11

| oxm_class | oxm_fields | oxm_hasmask | oxm_length | oxm_operator | oxm_value |
|---|---|---|---|---|---|
| comparison class | Output port 1 | 0 | 4 | '>' | '1400' |

FIG. 12

1210
Per Egress Table

| Counter | Bits | Type | Remarks |
| --- | --- | --- | --- |
| Reference Count | 32 | Required | Reference Count |
| Packet Lookups | 64 | Optional | Number Of Packet Lookups |
| Packet Matches | 64 | Optional | Number Of Packet Matches |

1220
Per Egress Flow Entry

| Counter | Bits | Type | Remarks |
| --- | --- | --- | --- |
| Received Packets | 64 | Optional | Number Of Received Packets |
| Received Bytes | 64 | Optional | Number Of Received Packet Bytes |
| Duration (seconds) | 32 | Required | Time Elapsed After Entry Registration(Seconds) |
| Duration (nanoseconds) | 32 | Optional | Time Elapsed After Entry Registration(Nanoseconds) |

PACKET OUTPUT CONTROLLING METHOD AND NETWORK DEVICE USING SAME

TECHNICAL FIELD

The present disclosure relates to a Software Defined Networking (SDN) technology, and more particularly to a technology of processing a pipeline of flow tables for packet forwarding, a method of controlling packet output, and a network apparatus using the same.

BACKGROUND ART

Software-defined networking (SDN) means a user-oriented network in which a user has control authority regardless of a basic network device such as a router or a switch, etc. and a separate software controller controls a flow of traffic.

OpenFlow is one variety of SDN technology and defines an interface connecting a hardware such as a router and a controller operating in a network operating system (OS), and is a protocol for separating a control plane for controlling how to transmit a data packet through a network from a physical network and interacting with a data plane for data transmission.

An OpenFlow switch may have a plurality of flow tables which are connected in a pipeline manner such that flexible parallel processing can be made possible and efficiency and flexibility can be provided to the OpenFlow switch.

When packets are processed through the pipeline, actions instructed by respective flow tables constituting the pipeline are stored in an action list, and finally constitute an action set at the last flow table of the pipeline. Also, meta-data messages are exchanged among the respective flow tables.

When a packet is inputted to a switch and passes through the respective flow tables, match fields and the action set are updated based on instructions defined in the respective flow tables for each flow.

The action may be executed immediately according to the instruction of each flow table, or may be accumulated in the action set. In the latter case, the accumulated action set is executed lastly after the packet passes all flow tables.

Meanwhile, an output port action for the pipeline processing is an action of finally forwarding a packet to an external entity. In this reason, once the output port action is performed, any further actions other than packet output cannot be performed on the packet. That is, any further action cannot be linked based on information on the output port action.

Also, a group table utilized for multicast operation transmitting packets through a plurality of output ports also has the same problem. Once a packet is forwarded to the plurality of output ports, any further actions other than packet output cannot be performed on the packet. That is, any further action cannot be linked based on an execution result of the group table.

DISCLOSURE

Technical Problem

The purpose of the present invention for resolving the above-described problem is to provide a method for processing flows according to output ports of the flows.

Also, another purpose of the present invention for resolving the above-described problem is to provide a network apparatus performing a method for processing flows according to output ports of the flows.

Technical Solution

The present invention to achieve the above-described purpose provides a method of processing a flow in a plurality (N, where N is a natural number of 2 or greater) of flow tables connected by a pipeline. The method may comprise passing a packet of the flow from a first flow table to an (N−1)-th flow table among the plurality of flow tables; processing an output-dedicated N-th flow table (egress table) guided by the (N−1)-th flow table with respect to the packet after the packet passes the (N−1)-th flow table; and outputting the packet after processing the egress table.

Here, the method may be performed in a network apparatus supporting software defined networking (SDN).

Here, an output port for the flow may be designated after the packet is passed through the (N−1)-th flow table, and an action to be executed in the egress table may be determined according to the designated output port.

Also, the processing the egress table may include attaching a Virtual Local Area Network (VLAN) tag to the packet to be outputted through the designated output port.

Also, the processing the egress table may include counting packets of flows to be outputted through the designated output port.

Also, the output port may be changed when a counted value of the packets of the flows is equal to or greater than a predetermined threshold value.

Also, the processing the egress table may include fragmentation of the packet when a size of the packet is equal to or greater than a predetermined threshold value.

The present invention to achieve the above-described another purpose provides a network apparatus comprising a flow table storing part storing a plurality (N, where N is a natural number of 2 or greater) of flow tables connected by a pipeline; a flow table processing part passing an inputted packet of a flow from a first flow table to an (N−1)-th flow table among the plurality of flow tables stored in the flow table storing part, and processing an output-dedicated N-th flow table (egress table) guided by the (N−1)-th flow table with respect to the packet after the packet passes the (N−1)-th flow table; and a packet output part outputting the packet of the flow after the flow table processing part processes the egress table.

Here, the network apparatus may be a network apparatus supporting software defined networking (SDN).

Here, an output port for the flow may be designated after the packet is passed through the (N−1)-th flow table, and an action to be executed in the egress table may be determined according to the designated output port.

Also, the processing the egress table may include attaching a Virtual Local Area Network (VLAN) tag to the packet to be outputted through the designated output port.

Also, the processing the egress table may include counting packets of flows to be outputted through the designated output port.

Also, the output port may be changed when a counted value of the packets of the flows is equal to or greater than a predetermined threshold value.

Also, the processing the egress table may include fragmentation of the packet when a size of the packet is equal to or greater than a predetermined threshold value.

Advantageous Effects

Using a method of processing flows according to the present invention and a network apparatus performing the same, in pipeline processing based on flow tables, further actions matched to an output port designated by the flow tables can be executed by using the egress table which is an output-dedicated flow table. Therefore, final packet output can be controlled flexibly through various actions linked to information on output ports.

DESCRIPTION OF DRAWINGS

FIG. 8 is a conceptual diagram illustrating configuration of fields in an egress table according to an exemplary embodiment of the present disclosure.

FIG. 9 is a conceptual diagram illustrating configuration of match fields of an egress table.

FIG. 10 is an exemplary view to explain an example of utilizing match fields comprising a wild card in an egress table according to the present disclosure.

FIG. 11 is an exemplary view to explain an example of utilizing match fields for size comparison in an egress table according to the present disclosure.

FIG. 12 is an exemplary view to explain an example of utilizing match fields for flow counting in an egress table according to the present disclosure.

BEST MODE

Figure 1:
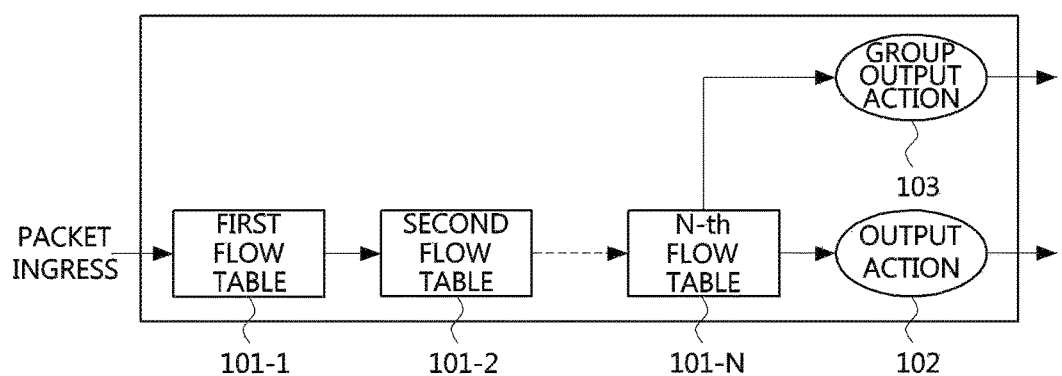
FIG. 1 and FIG. 2 are conceptual diagrams to explain a method for processing flow tables in a pipeline manner.

While the invention is susceptible to various modifications and alternative forms, specific embodiments thereof are shown by way of examples in the drawings and will herein be described in detail. It should be understood, however, that there is no intent to limit the invention to the particular forms disclosed, but on the contrary, the invention is meant to cover all modifications, equivalents, and alternatives falling within the spirit and scope of the invention. Like numbers refer to like elements in the accompanying drawings.

It will be understood that, although the terms first, second, A. B, etc. may be used herein to describe various elements, these elements should not be limited by these terms. These terms are only used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, it will be understood that when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the appended drawings.

As methods for processing flow tables in a pipeline manner performed in a network apparatus, there are two methods. In the first method, packets are passed through respective flow tables and actions for a flow to which the packets belong are immediately executed in respective flow tables. Also, in the second method, actions for the flow to which the packets belong are accumulated in an action set, and the action set is executed after packets passed all flow tables.

Figure 2:
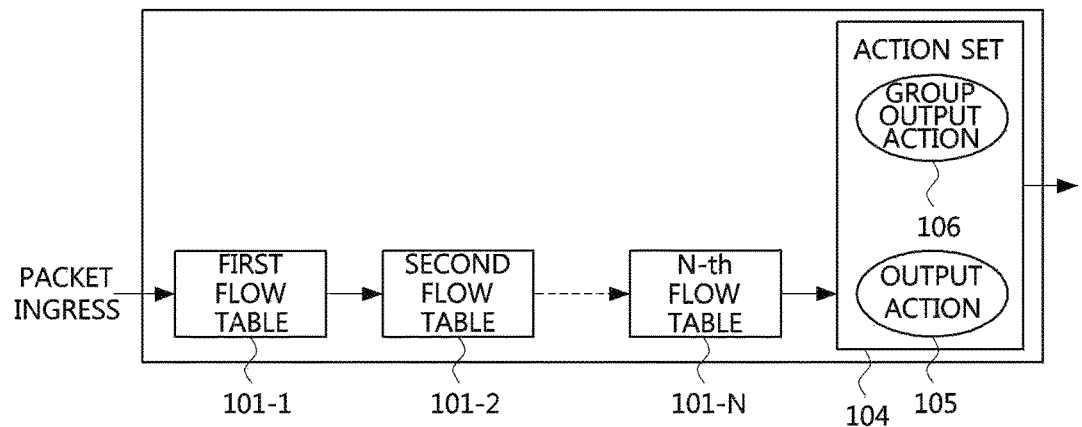

FIG. 1 and FIG. 2 are conceptual diagrams to explain a method for processing flow tables in a pipeline manner.

First, FIG. 1 illustrates a case in which an output action 102 or a group output action 103 is performed for a specific flow in a last N-th flow table 101-N among a plurality (N, N is a natural number of 2 or greater) of flow tables 101-1 to 101-N.

Meanwhile, FIG. 2 illustrates a case in which an output action 105 or a group output action 106 among actions indicated by instructions accumulated in an action set 104 is performed after a specific flow passes the last N-th flow table of the N flow tables 101-1 to 101-N. That is, the output action or the group output action in the action set may be executed lastly.

For both of the above cases, an output port for the flow to which the packets belong is designated by the output action or the group output action, and the packets belonging to the flow are forwarded through the designated output port. Also, once the output port is designated, any further actions cannot be performed on the flow. That is, any action cannot be linked based on information on the designated output port.

Also, flow tables are processed in the pipeline manner as described above. Thus, flows can be forwarded to another flow table existing only in the forward direction of the pipeline by using an instruction 'GoTo Table', and thus the instruction 'GoTo Table' cannot be used in the last flow table.

Methods for Processing Flows According to the Present Disclosure

In order to resolve the above-described problem, a method of processing flow tables according to an exemplary embodiment of the present disclosure may introduce an egress table which is an output-dedicated flow table. That is, when there exist a plurality (N, n is a natural number of 2 or greater) of flow tables, the last flow table (N-th flow table) may become or include the egress table.

Figure 3:
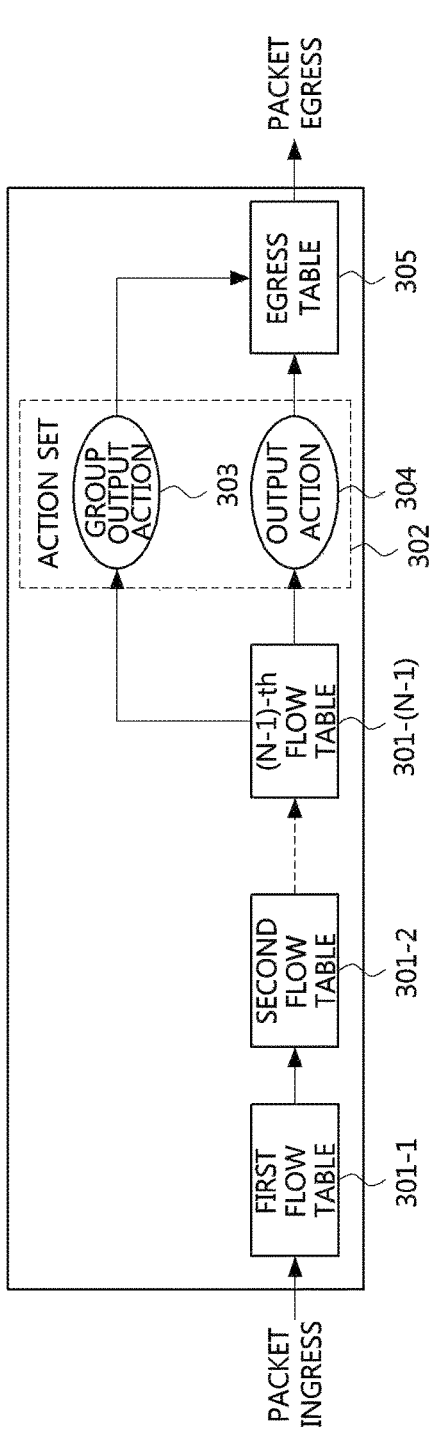
FIG. 3 is a conceptual diagram to explain a method of processing flows according to an exemplary embodiment of the present disclosure.

FIG. 3 is a conceptual diagram to explain a method of processing flows according to an exemplary embodiment of the present disclosure.

Referring to FIG. 3, a switch according to the present invention may have (N−1) flow tables 301-1, 301-2, . . . , and 301-(N−1), and an egress table 305, and they are connected in the pipeline manner.

A packet inputted to the switch may pass from the first flow table 301-1 to the (N−1)-th flow table 301-(N−1). After then, an accumulated action set 302 may be executed. After a group output action 303 or output action 304 among actions included in the action set 302 is performed lastly, the packet can be transferred to the egress table 305. Alternatively, as illustrated in FIG. 1, immediate execution of the output action or the group output action may also make the flow be transferred to the egress table 305 without using such the action set.

In the egress table 305, an operation for an output port designated by the group output action 303 or the output action 304 may be performed such that the packet is outputted through the designated output port.

Hereinafter, in order to explain the above-described method of processing flows according to the present invention in further detail, an exemplary embodiment for Virtual Local Area Network identifier (VLAN ID) tagging will be explained first as a representative exemplary embodiment using the egress table.

Figure 4:
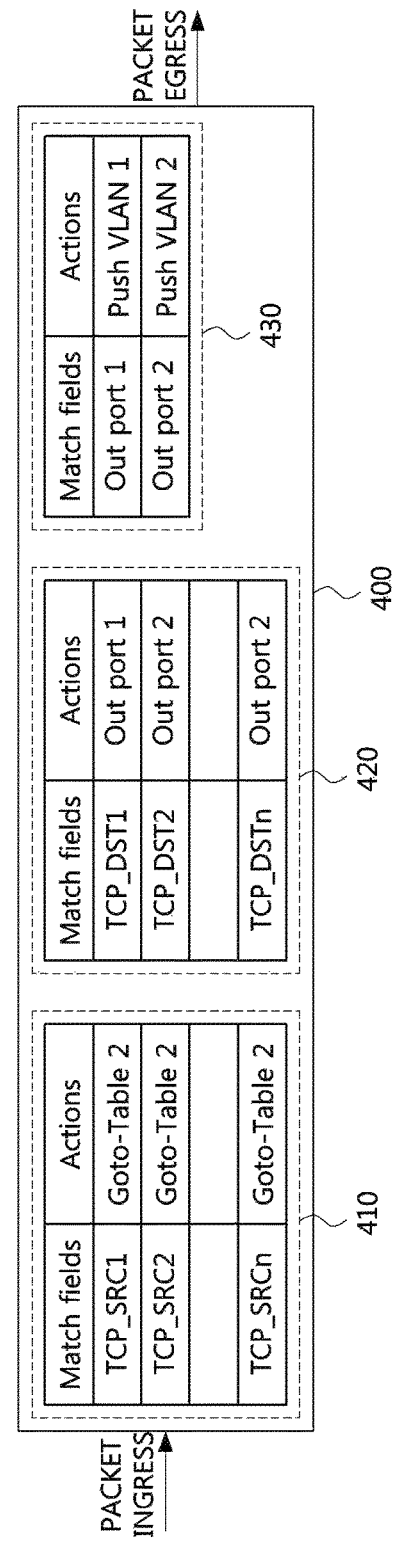
FIG. 4 is a conceptual diagram to explain an exemplary embodiment for VLAN ID tagging according to a method for processing flows according to the present invention.

FIG. 4 is a conceptual diagram to explain an exemplary embodiment for VLAN ID tagging according to a method for processing flows according to the present invention. That is, FIG. 4 exemplarily illustrates a method of processing the egress table after executing the output action of the last flow table.

A packet inputted to a switch 400 may pass a first flow table 410 and a second flow table 420. In each flow table, a flow to which the packet belongs is searched by using match fields of each flow table, and an action indicated by a corresponding actions field may be executed.

In the exemplary embodiment illustrated in FIG. 4, after an output action (e.g., 'Out port 1' or 'Out port 2' of the second flow table 420) is executed in the second flow table 420, the packet may not be outputted from the switch. Instead, the packet may be transferred to the egress table 430. In the egress table 430, an action 'Push VLAN' corresponding to the output port designated by the output action of the second flow table may be executed, and then the packet is outputted. That is, a 'Push VLAN1' action is executed for packets whose output ports are designated as an output port 1, and a 'Push VLAN2' action is performed for packets whose output ports are designated as an output port 2.

In the above-described exemplary embodiment, if the egress table is not used, actions 'Push VLAN1' should be respectively inserted into action sets for all flow entries to be outputted through the output port 1, such that the actions 'Push VLAN1' can be executed before the actions 'Output port1'. Thus, as the number of flow entries in the second flow table increases, inefficiency increases significantly.

Figure 5:
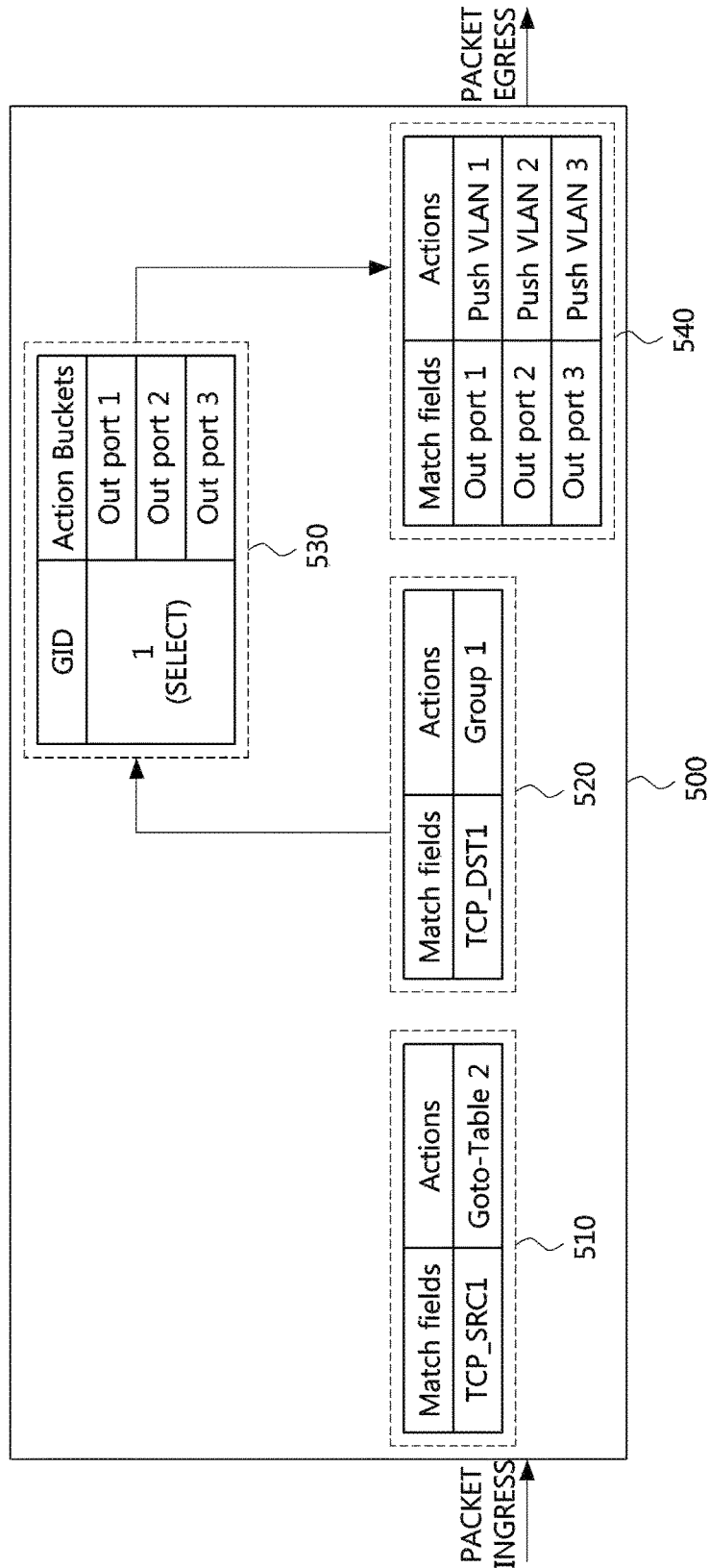
FIG. 5 is another conceptual diagram to explain an exemplary) embodiment for VLAN ID tagging according to a method for processing flows according to the present disclosure.

FIG. 5 is another conceptual diagram to explain an exemplary) embodiment for VLAN ID tagging according to a method for processing flows according to the present disclosure. That is, FIG. 5 illustrates a method of processing flow tables after performing a group output action of a group table.

A packet inputted to the switch 500 may pass a first flow table 510 and a second flow table 520. In each flow table, a flow to which the packet belongs is searched by using match fields of each flow table, and an action indicated by a corresponding actions field may be executed.

In the second flow table 520, according to a group instruction (e.g., 'Group 1' of the second flow table 520), multiple output actions (i.e., multicasting) defined in a group table 530 are performed, and the packet is transferred to an egress table 540.

In the egress table 540, according to output ports designated by the group table, the action 'Push VLAN' may be executed for the designated output ports, and the packet may be outputted from the switch 500.

Therefore, by using the egress table (i.e., by identifying corresponding output ports based on field matching, and executing actions 'Push VLAN' designated by the corresponding output ports), it may become possible to control all flows to be outputted through the corresponding output port. Through this, it can be made possible in the pipeline processing to fully utilize independency among flow tables and advantages of parallel processing.

Hereinafter, in order to explain the above-described method of processing flows according to the present disclosure in further detail, exemplary embodiments for changing an output port based on flow counting and packet fragmentation will be explained.

Figure 6:
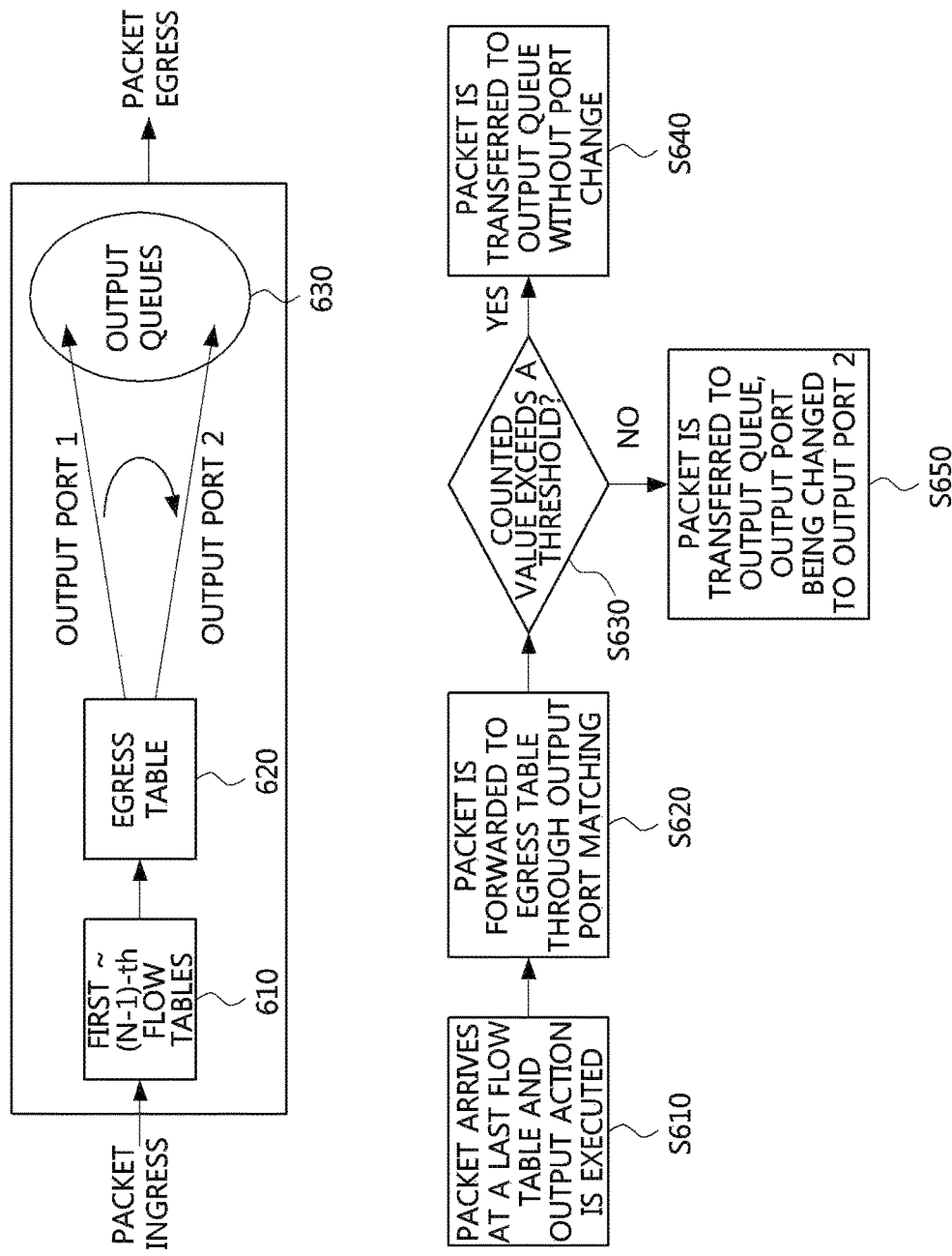
FIG. 6 is a conceptual diagram to explain an exemplary embodiment for an output port changing method based on flow counting using a method for processing flows according to the present disclosure.

FIG. 6 is a conceptual diagram to explain an exemplary embodiment for an output port changing method based on flow counting using a method for processing flows according to the present disclosure.

A packet inputted to a switch 600 arrives at a last flow table 610. Accordingly an action designating an output port1 may be executed (S610), and the packet is transferred to an egress table 620 (S620). In the egress table 620, the packet transferred to the output port1 may be counted according to an action corresponding to the output port1, and it can be determined whether a counted value exceeds a predetermined threshold (S630).

In a case that the counted value on flows transferred to the output port1 does not exceed the predetermined threshold value, without changing the output port from the output port1 to another port (e.g., output port2), the packet may be transferred to an output queue 630. On the contrary, in a case that the counted value on flows transferred to the output port1 exceeds the predetermined threshold value, the output port for the packet may be changed from the output port1 to an output port2, and the packet may be transferred to the output queue 630 (S650).

Figure 7:
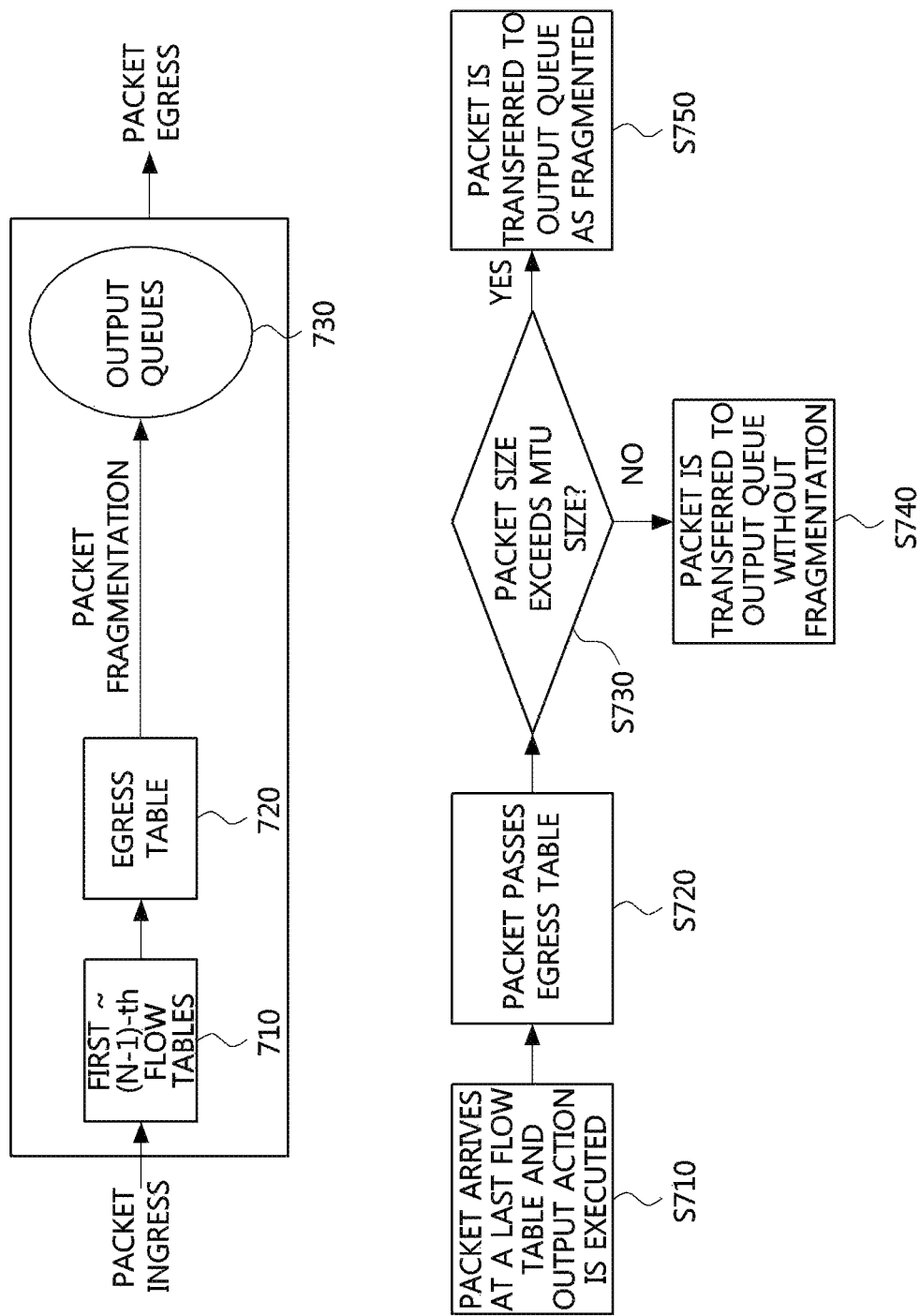
FIG. 7 is a conceptual diagram to explain an exemplary embodiment for packet fragmentation using a method for processing flows according to the present disclosure.

FIG. 7 is a conceptual diagram to explain an exemplary embodiment for packet fragmentation using a method for processing flows according to the present disclosure.

A packet inputted to a switch 700 arrives at a last flow table 710. Accordingly, an output action designating an output port1 may be executed (S710), and the packet is transferred to an egress table 720 (S720). Before the packet is transferred to an output queue 730 through the output port1, the size of the packet may be compared with a Maximum Transmission Unit (MTU) size of the output port1 (S730).

If the size of packet does not exceed a predetermined threshold value, the output port1 transfers the packet to the output queue 730 without packet fragmentation (S740). On the contrary, if the size of the packet exceeds the predetermined threshold value, the packet may be separated into two or more fragments, and the fragments are transferred to the output queue 730 (S750).

Configuration of Fields of Egress Table and Match Fields

FIG. 8 is a conceptual diagram illustrating configuration of fields in an egress table according to an exemplary embodiment of the present disclosure, and FIG. 9 is a conceptual diagram illustrating configuration of match fields of an egress table.

Referring to FIG. 8, an egress table may comprise match fields, a 'Priority' field, a 'Counters' field, a 'Instructions' field, a 'Timeouts' field, and a 'Cookie' field.

Also, referring to FIG. 9, the match fields are composed as a form having repeated 'Type'-'Length'-'Value' (TLV) formats. More specifically, a class field (oxm_class) indicating a class of matching operation (e.g., 'matching class' or 'comparison class'), a field (oxm_field) indicating a field used for matching operation, and a masking field (oxm_hasmask) indicating whether bit-masking is applied or not may constitute a 'Type' field, a length field (oxm_length) may constitute a 'Length' field, and a value used for actual field matching may constitute a 'Value' field.

In such the configuration, if the class field (oxm_class) is configured as a specific value indicating (e.g., 'comparison class') and the value field is configured with an operator and an operand for the operator, comparison operation can be performed instead of a simple matching operation (i.e., the cases in which the class field is set to 'matching class'). Various examples of utilizing the match fields will be explained in detail by referring to FIGS. 10 to 12.

The above-described comparison operation will be utilized for the exemplary embodiment for flow counting explained in FIG. 6 and the exemplary embodiment for packet fragmentation explained in FIG. 7.

FIG. 10 is an exemplary view to explain an example of utilizing match fields comprising a wild card in an egress table according to the present disclosure.

Referring to FIG. 10, in order to match 10.1.1.1 to 10.1.1.255 with respect to the matching field 'DST_IP', a bitmask 255.255.255.0 is used for matching.

Also, FIG. 11 is an exemplary view to explain an example of utilizing match fields for size comparison in an egress table according to the present disclosure.

Referring to FIG. 11, in order to compare the size of inputted packet and MTU size of the output port1 as explained in the exemplary embodiment of FIG. 7, a comparison equation '1400>MTU size' is represented by using a comparison operator (greater than (>)). That is, in the case, without using 'oxm_bitmask' field, the oxm_operator field is configured as '>', and a comparison value 1400 is set to the oxm_value field.

Also, FIG. 12 is an exemplary view to explain an example of utilizing match fields for flow counting in an egress table according to the present disclosure.

Referring to FIG. 12, a counter 1210 for the egress table and a counter 1220 for egress flow entry of the egress table are defined and managed such that flow counting in the egress table can be made possible.

Network Apparatus According to the Present Invention

Figure 13:
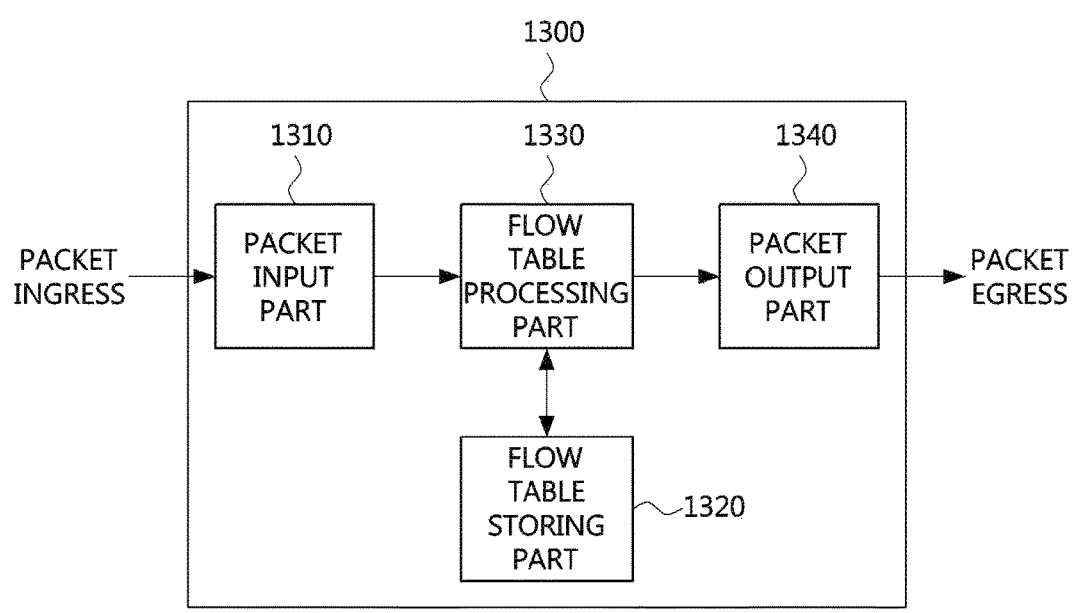
FIG. 13 is a block diagram to explain an exemplary embodiment of a network apparatus for performing a method of processing flows according to the present disclosure.

FIG. 13 is a block diagram to explain an exemplary embodiment of a network apparatus for performing a method of processing flows according to the present disclosure.

Referring to FIG. 13, a network apparatus for processing flows according to the present invention may comprise a packet input part 1310, a flow table storing part 1320, a flow table processing part 1330, and a packet output part 1340.

The packet input part 1310 is a component for receiving a packet constituting a flow from an external entity.

The flow table storing part 1320 is a component for storing a plurality (N, N is a natural number of 2 or greater) of flow tables. Here, a last flow table among the plurality of flow tables may be or include an egress table which was explained above. The flow table storing part 1320 may be implemented using one or more of various non-volatile memory devices.

The flow table processing part 1330 is a component for processing the packet inputted through the packet input part 1310 based on the flow tables stored in the flow table storing part 1320. Here, the flow table processing part 1330 may pass the packet from a first flow table to a (N−1)-th flow table, and perform an action of the egress table (i.e., a N-th flow table) indicated by the (N−1)-th flow table.

That is, once an output port for the packet is indicated after passing the (N−1)-th flow table, the action to be performed in the N-th flow table (egress table) may be determined according to the indicated output port.

Finally, the packet output part 1340 is a component for outputting the packet processed by the flow table processing part 1330 from the switch 1300 to an external entity, While the example embodiments of the present invention and their advantages have been described in detail, it should be understood that various changes, substitutions and alterations may be made herein without departing from the scope of the invention.

The invention claimed is:

1. A method of processing a flow in a plurality (N, where N is a natural number of 2 or greater) of flow tables connected by a pipeline, the method comprising:
    passing a packet of the flow from a first flow table to an (N−1)-th flow table among the plurality of flow tables;
    processing an output-dedicated N-th flow table (egress table) guided by the (N−1)-th flow table with respect to the packet after the packet passes the (N−1)-th flow table, the N-th flow table defining actions to be executed after designation of output ports; and
    outputting the packet after processing the egress table,
    wherein the method is performed in a network apparatus supporting software defined networking (SDN), and
    wherein an output port for the flow is designated after the packet is passed through the (N−1)-th flow table, and an action to be executed in the egress table is determined according to the designated output port.

2. The method according to claim 1, wherein the processing the egress table includes attaching a Virtual Local Area Network (VLAN) tag to the packet to be outputted through the designated output port.

3. The method according to claim 1, wherein the processing the egress table includes counting packets of flows to be outputted through the designated output port.

4. The method according to claim 3, wherein the output port is changed when a counted value of the packets of the flows is equal to or greater than a predetermined threshold value.

5. The method according to claim 1, wherein the processing the egress table includes fragmentation of the packet when a size of the packet is equal to or greater than a predetermined threshold value.

6. A network apparatus comprising:
a flow table storing part storing a plurality (N, where N is a natural number of 2 or greater) of flow tables connected by a pipeline;
a flow table processing part passing an inputted packet of a flow from a first flow table to an (N−1)-th flow table among the plurality of flow tables stored in the flow table storing part, and processing an output-dedicated N-th flow table (egress table) guided by the (N−1)-th flow table with respect to the packet after the packet passes the (N−1)-th flow table, the output-dedicated N-th flow table defining actions to be executed after designation of output ports; and
a packet output part outputting the packet of the flow after the flow table processing part processes the egress table,
wherein the network apparatus is a network apparatus supporting software defined networking (SDN), and
wherein an output port for the flow is designated after the packet is passed through the (N−1)-th flow table, and an action to be executed in the egress table is determined according to the designated output port.

7. The network apparatus according to claim 6, wherein the processing the egress table includes attaching a Virtual Local Area Network (VLAN) tag to the packet to be outputted through the designated output port.

8. The network apparatus according to claim 6, wherein the processing the egress table includes counting packets of flows to be outputted through the designated output port.

9. The network apparatus according to claim 8, wherein the output port is changed when a counted value of the packets of the flows is equal to or greater than a predetermined threshold value.

10. The network apparatus according to claim 6, wherein the processing the egress table includes fragmentation of the packet when a size of the packet is equal to or greater than a predetermined threshold value.

* * * * *